Nov. 4, 1958 J. KENT 2,858,889

COMBINED PRINTING AND PUNCHING MACHINE

Filed June 21, 1956 5 Sheets-Sheet 1

INVENTOR
JOHN KENT
BY Jesse A. Holton
ATTORNEY

Nov. 4, 1958 J. KENT 2,858,889

COMBINED PRINTING AND PUNCHING MACHINE

Filed June 21, 1956 5 Sheets-Sheet 2

INVENTOR
JOHN KENT
BY Jesse A. Holton
ATTORNEY

INVENTOR.
JOHN KENT

BY Jesse A. Holton
ATTORNEY

INVENTOR
JOHN KENT
BY Jesse A. Holton
ATTORNEY

COMBINED PRINTING AND PUNCHING MACHINE

Filed June 21, 1956 5 Sheets-Sheet 5

INVENTOR
JOHN KENT
BY Jesse A. Holton
ATTORNEY

United States Patent Office 2,858,889

Patented Nov. 4, 1958

2,858,889

COMBINED PRINTING AND PUNCHING MACHINE

John Kent, Hove, England, assignor to Underwood Corporation, New York, N. Y., a corporation of Delaware Application June 21, 1956, Serial No. 592,911

7 Claims. (Cl. 164—113)

Figures 1, 2:
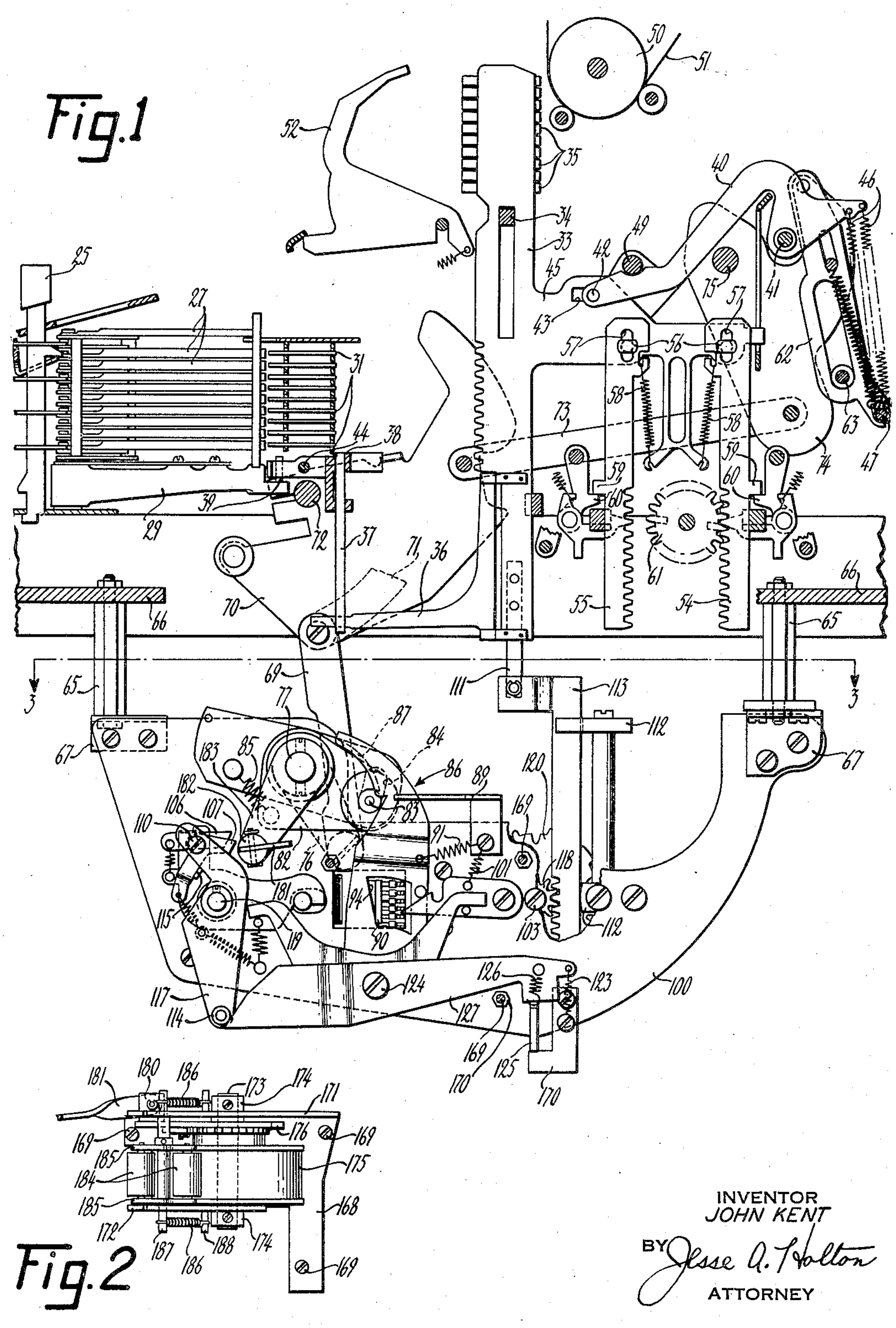

This application relates to tape punching mechanism, and more particularly to a tape punching mechanism connected to a well known type of adding machine to produce a punched tape as amounts and totals are printed by the adding machine.

Tape records are in general use as input media for high-speed electronic computers and printing devices. Magnetically recorded tape is used where changes in recorded material are to be made or the record is transitory but for permanent original records, a punched paper tape is preferred to prevent accidental loss or change of data. The machine herein disclosed utilizes a tape punching mechanism which is controlled by a commercial adding machine to prepare a record list of an inventory, sales, or other such data and simultaneously to punch the same data on a paper tape for later automatic use.

It is accordingly an object of this invention to develop a tape punching mechanism which may be operated by an adding machine to punch a record in a paper tape concomitantly with the production of a printed record.

Another object is the development of a tape punching device operable to gang punch a complete item in a tape during an operation in which the item is entered into an adding machine or printed as a total of previously entered amounts.

It is also an object of this invention to conserve storage space and reduce costs through use of combinational punchings in fewer punch positions than the number of digits in each denominational order which enables a narrow paper tape to be used.

Still another object is the provision of a punching mechanism operable to feel off a set of differentially settable notched wheels and to combinationally punch a record tape in accordance with the setting of such wheels and, additionally, to punch simultaneously therewith, a series of index holes and a series of tape feed perforations.

A still further object is the development of a punch operating mechanism which is powered by springs which may be energized over a substantial period of machine operating time and which mechanism, therefore, does not impose shock loads on the motor or driving mechanism.

Other objects will be in part obvious and in part pointed out in the following description and appended drawings of a preferred embodiment of my invention.

Figures 3, 4, 5:
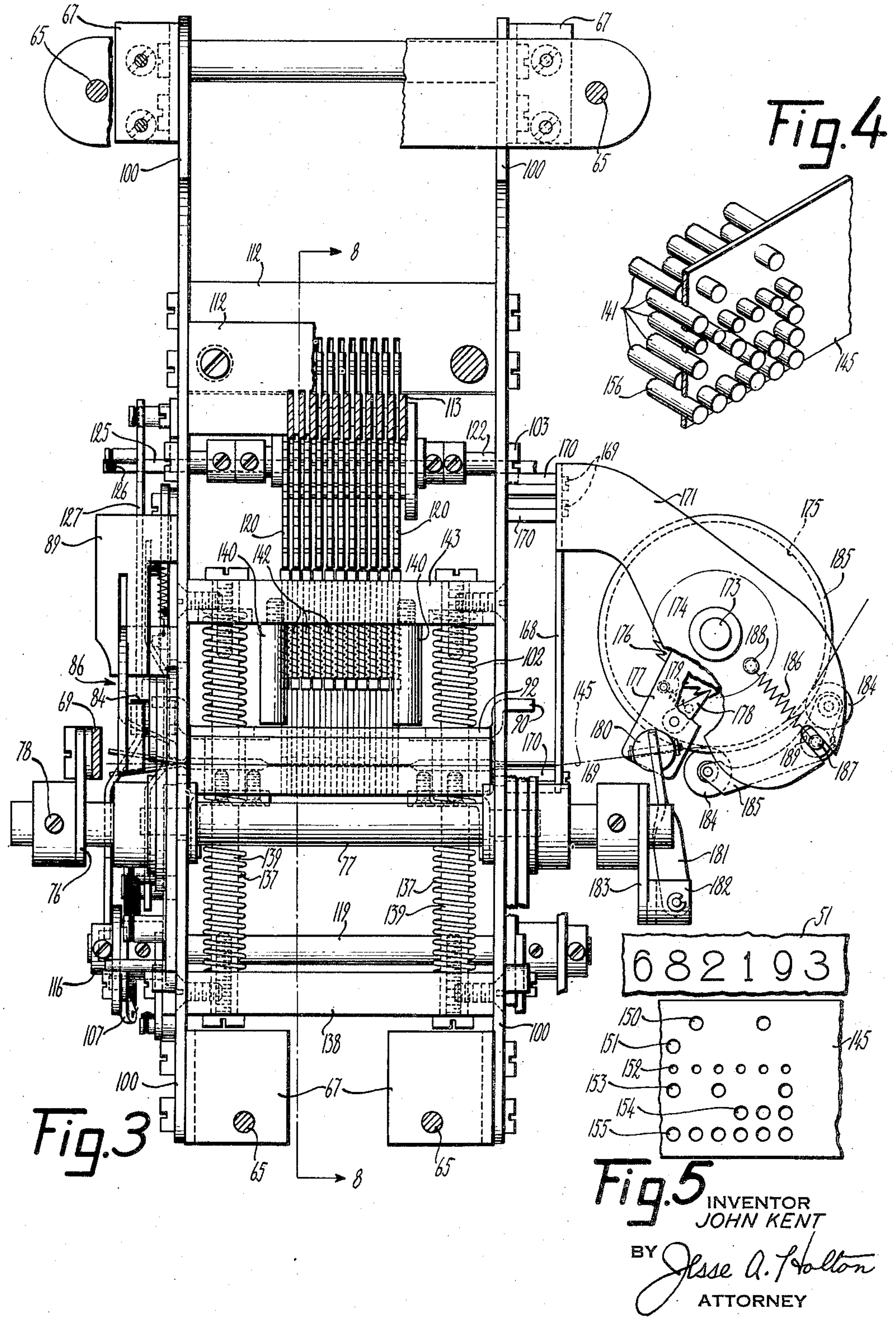
Figures 6, 7, 8:
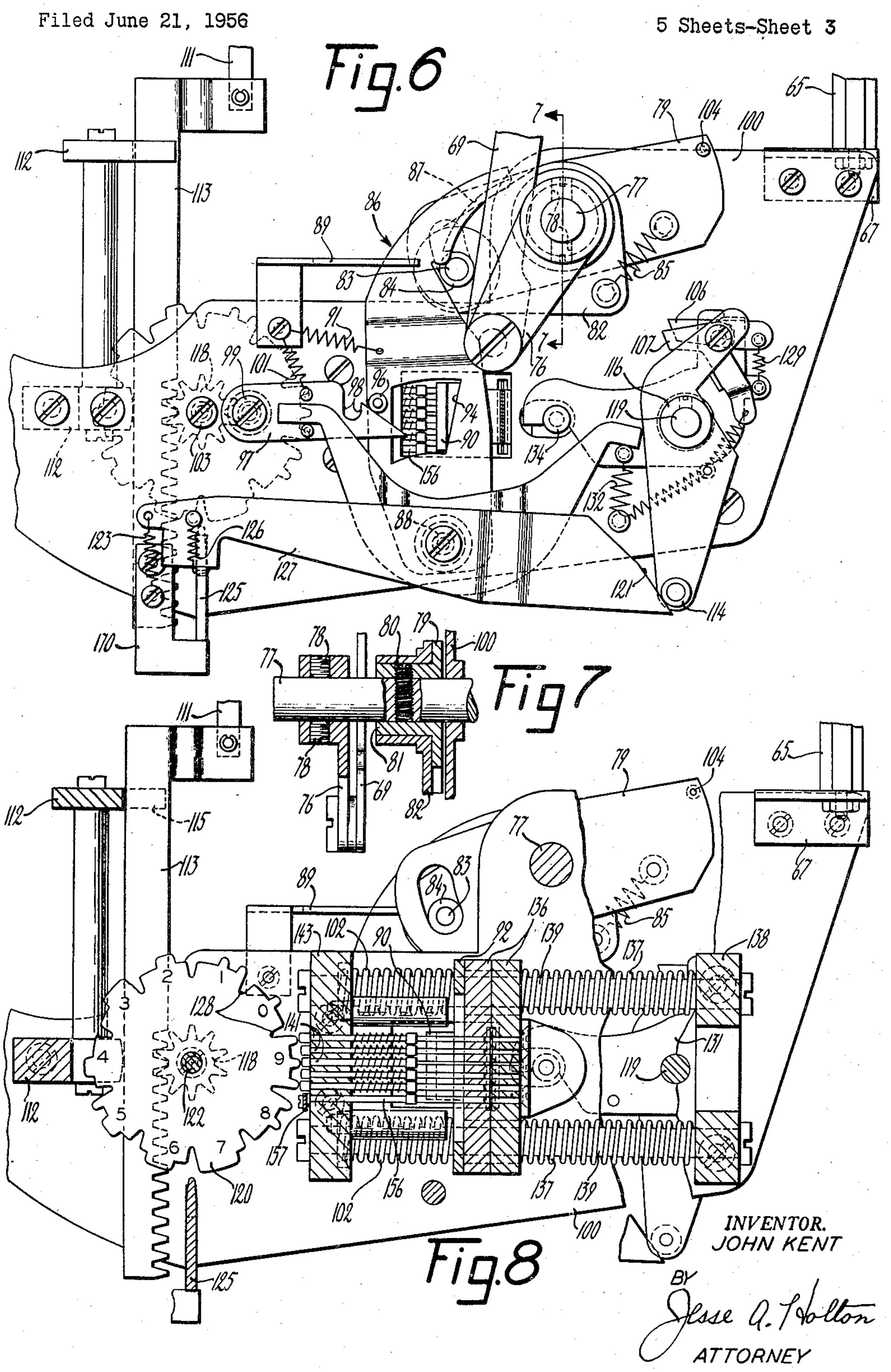
Figure 9:
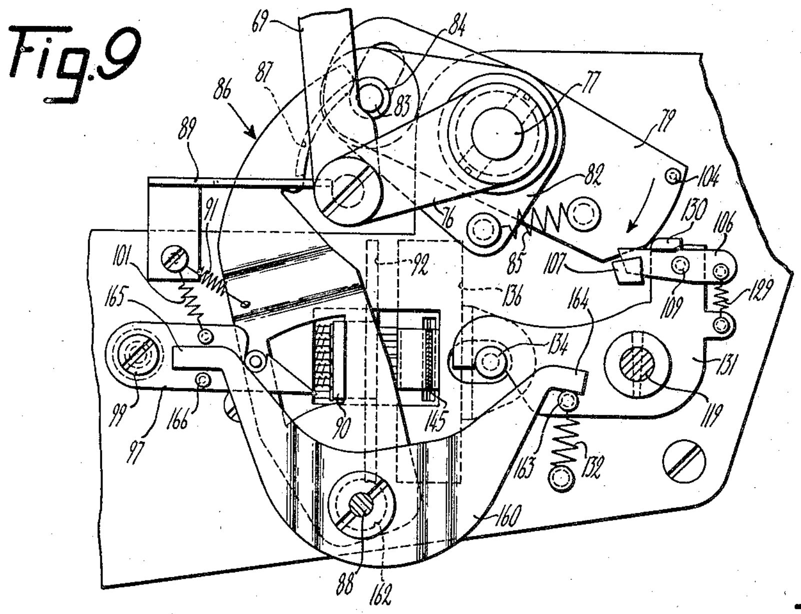
Figures 10, 11:
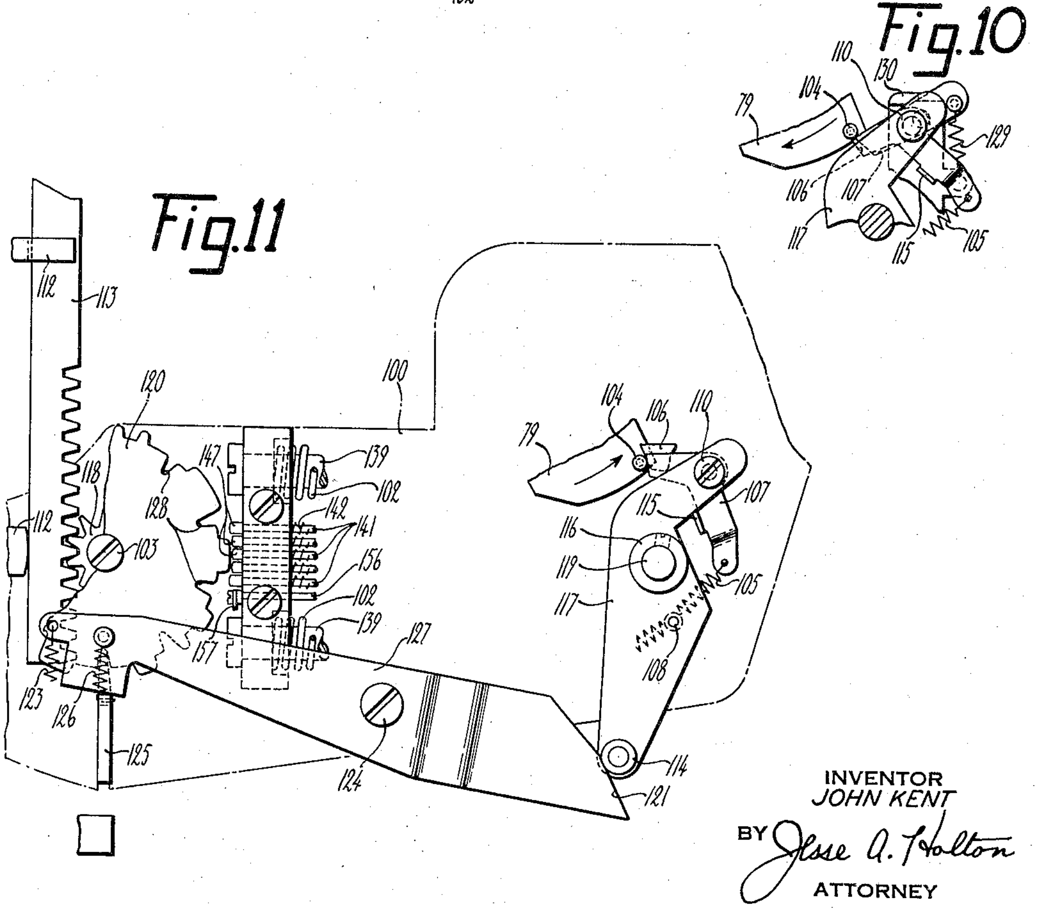
Figures 12, 13, 14, 15, 16:
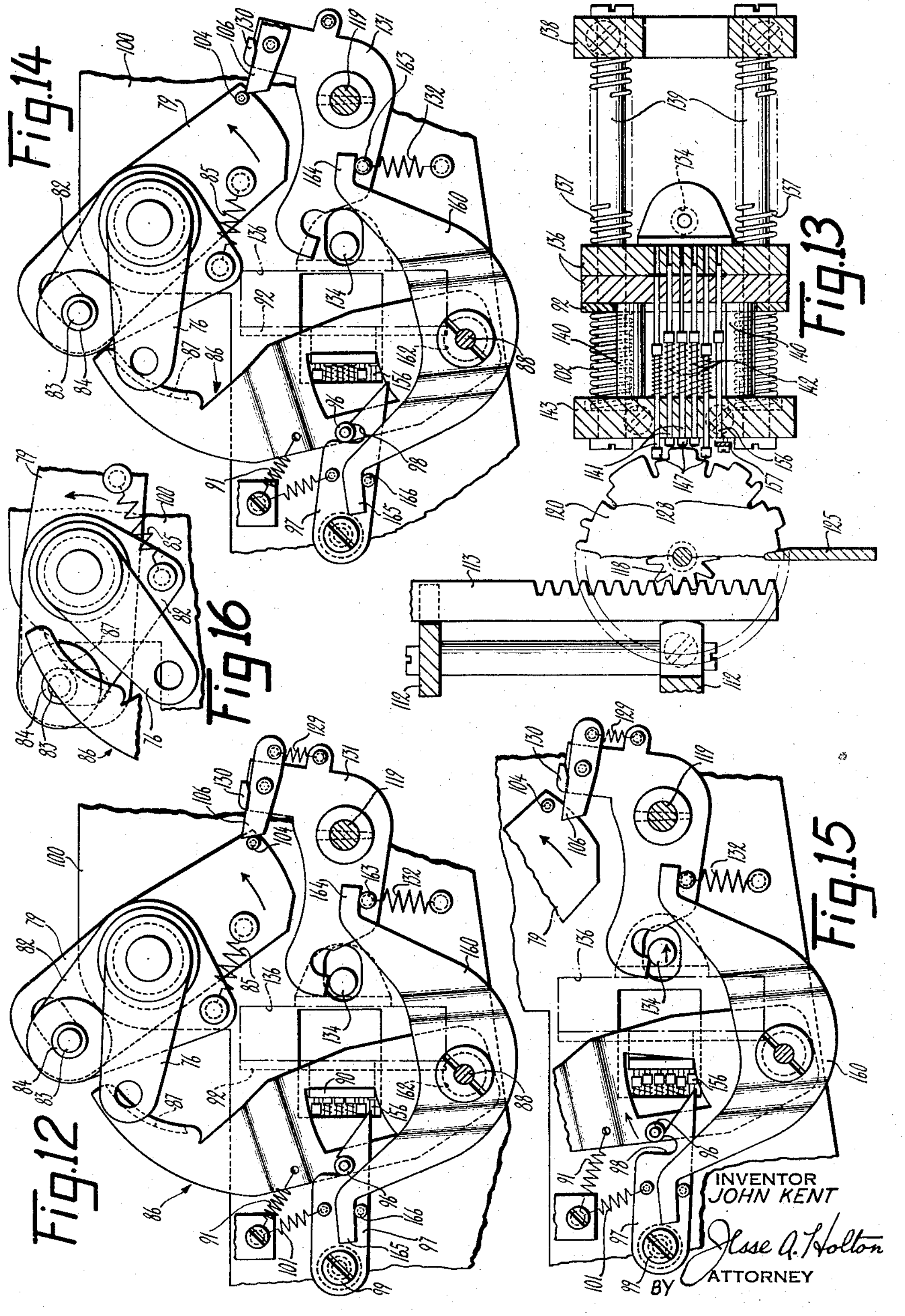

In the drawings:

Figure 1 is a right side view of my improved machine showing the adding machine portion in section and the right side of the punching unit which is secured below the adding machine, Figure 2 is a right side elevation of the tape feeding mechanism to draw tape through the punching mechanism of Figure 1 and which is attached to the right side of the punch mechanism as shown in Figure 1, Figure 3 is a general plan view, taken along the line 3—3 of Figure 1, of the punching unit together with the tape feeding mechanism with some frame parts broken away for clarity, Figure 4 is an enlarged front perspective view showing the punches immediately after they have pierced the tape and recorded an item therein, Figure 5 is a representation of a portion of a printed tape and a portion of a punched tape with the same item recorded in both, Figure 6 is a left side elevation of the tape punching mechanism in the normal or rest position, Figure 7 is a sectional view taken along the line 7—7 of Figure 6 and showing the main operating shaft and drive arm, Figure 8 is a left sectional view, taken along the lines 8—8 of Figure 3, Figure 9 is an activated fragmentary left side elevation showing conditioning of the punching mechanism during the advance stroke of the main actuating arm, Figure 10 is a detail view of a part of the mechanism of Figure 9 showing the main actuating arm at a later point in its advance stroke and a pin thereon bypassing the wheel aligning and the punch-block releasing pawls, Figure 11 is an activated fragmentary left side elevation showing the main actuating arm shortly after the start of its return stroke at which time it has moved an aligner bar into the punch controlling notched discs, Figure 12 is an activated fragmentary left side elevation showing the main actuating arm at a later point in its return stroke where it is releasing the punch die block to effect a punching operation, Figure 13 is a section similar to a part of Figure 8 but showing the position of the punch die block at the same portion of the cycle as the other devices shown in Figure 12, Figure 14 is a view similar to Figure 12 but showing the main actuating arm at a slightly later time in its return stroke wherein it has unlatched the restoring plate to return the punch die to its normal position, Figure 15 is a view similar to Figure 14 showing the main actuating arm at a still later portion of its return stroke with the punch die block returning to home position and the latching mechanism in readiness to be effective, and Figure 16 is a fragmentary view showing the bypass action between the drive arm and the restoring plate cocking arm during the return stroke of the arm.

GENERAL DESCRIPTION

In general, the present description includes an adding machine of a commercial type having a gang of printing members movable differential extents during machine cycles to print indexed amounts and totals of such amounts. The motion of each of these printing members is used to position a notched disc to select a combination of punches representative of a character being printed. A punch die block carries a paper tape across the ends of all of the punches and is spring propelled during a machine cycle to force such punches as are selected by the notched discs through the paper tape to record the set up item. After such punching, a restoring plate driven by springs is released to restore the punch die block to its home position. The restoring plate springs are stronger than those for the punch die block and will recompress the punch die block springs when the restoring plate is released. The restoring plate may be driven to a cocked position clear of the path of movement of the die block to reload the restoring plate springs during any part of the cycle prior to the release of the punch die block. A tape feeding mechanism is driven by the adding machine after the tape is punched to present a clean portion of tape to the punches for the next cycle.

*Printing machine*

The printing machine used to illustrate the preferred embodiment of my invention is basically the commercial "Sundstrand" adding machine. This machine is well known in the art and is fully disclosed in U. S. Patent No. 1,965,611 issued July 10, 1934 to Oscar J. Sundstrand and will therefore be but briefly described herein and only with reference to the structure required for an understanding of the present invention.

Referring to Figure 1 a number of digit keys 25, normally ten in number and only one of which is shown, are each connected to one of a group of push rods 27 mounted in a swingable frame 29 whose rear end is normally urged toward the right of the machine. A stationary group of settable stop pins 31 are traversed, column by column, by the push rods 27, one column for each operation of a digit key 25, which key operation will first set the stop pin 31 which is in alignment with the operated interponent 27 to a rearward active position.

A plurality of type bars 33, only one of which is shown, are vertically slidable on a fixed rod 34 to position at a printing line, type 35 mounted on their upper ends and each type bar 33 has a forwardly extending swingable arm 36 pivoted to its lower end. The forward end of each arm 36 is engaged in a slot in the tail pin 37 vertically movable into engagement with the set one of the aligned column of stop pins 31. A transverse frame 38 slides on a fixed rod 44 and embraces a pin 39 in the rear end of swinging frame 29 to move in synchronism therewith and guide the upper ends of tail pins 37 in vertical alignment with the successive columns of pins 31. The type bars 33 are normally retained in their lower position shown in Figure 1 and are tensioned upwardly to bring their tail pins 37 into engagement with the set ones of the stop pins 31 by individual arms 40 pivoted on a shaft 41 near the rear of the machine. Each arm 40 carries a stud 42 on its forward end, said stud resting in a slot 43 in a rearward projection of the associated type bar 33. The arms 40 are urged clockwise by springs 46 connected between their rear ends and a rod 47 which is driven downwardly during each machine cycle. A bar 49 overlies all of the arms 40 to hold the arms 40 and the type bars 33 in their normal positions shown in Figure 1, and is raised during each machine cycle to free the arms 40 and permit springs 46 to drive arms 40 and the type bars 33 to an upper limit wherein the tail pins 37 engage the set pins 31. Return of bar 49 thereafter will restore these parts to their normal positions.

A platen 50, is positioned to the rear of the type 35 to support a paper tape 51 in the printing position between the type 35 and platen 50. The type 35 are driven rearwardly after the type bars 33 are properly positioned, to print upon the paper tape 51, by the type hammers 52, one for each type bar 33, as more fully described in the above noted patent.

Carried by the rearward projections of the type bars 33 are two groups of rack bars 54 and 55 slidably connected to said projections by pins 56 thereon. Pins 56 pass through slots 57 in the rack bars 54 and 55 to guide the upper ends of the racks. The rack bars 54 and 55 are tensioned downwardly by springs 58 between the rack bars and type bar 33 to urge the bars 54 and 55 to a position below the normal rest position of Figure 1. The normal position of the racks 54 and 55 is determined by the engagement of an ear 59 on the rack 54 or 55 with a pivoted tens transfer lug 60. A register 61 is positioned between the rack bars 54 and 55 and is engageable with racks 54 for addition and positive totals and with racks 55 for subtraction and negative totals. The register 61 is moved into and out of engagement with racks 54 and 55 at the appropriate times by structure not required herein but fully shown in the above mentioned patent.

The main driving parts of the adding machine comprise a main shaft 72 driven first counterclockwise, Figure 1, and then clockwise by a motor driven link 71 and a cam plate 70 on the left end of shaft 72. A second cam plate 70 is on the right end of shaft 72, and a pair of links 73 extend rearwardly between each cam 70 and rear plates 74 pivoted one on each end of a shaft 75. A pair of links 62, one pivoted on each rear plate 74, are slidable on a fixed rod 63 and carry the previously mentioned rod 47 between them, whereby springs 46 are additionally tensioned during each cycle of shaft 72.

*Punch conditioning mechanism*

As best seen in Figure 1, a tape punching unit is secured to the underside of the basic adding machine by studs 65 secured at their upper portions in base 66 of said adding machine and at their lower portions to brackets 67 supporting the tape punching unit, see also Figure 3. The tape punching unit is cyclically operated in unison with the adding machine by a link 69 connected to the left one of the cyclically operated cam plates 70. At its lower end link 69 is connected to a crank arm 76, see Figures 6 and 7, which in turn is rigidly secured by screws 78 to a main cycling shaft 77 in the punching unit. Shaft 77 extends across the upper portion of the punching unit, Figure 3, and is journaled in two frames 100, Figure 3, supported on the brackets 67 and forming the main side frames of the punching unit. Oscillation of shaft 77 through link 69 will operate the punching control mechanism which will act during the cycle to perforate a paper tape as will presently be described. The punch control mechanism is with the exception of the tape feeding mechanism, substantially the same on both sides of the punching unit. The following description will, for simplicity, refer to one side only but it is to be understood that unless otherwise stated, each of the mechanisms referred to is duplicated on the opposite side of the punching unit.

A plate 79 is rigidly secured to each end of shaft 77 as by a set screw 80, Figure 7, screwed into a hole in said shaft. Loosely mounted on a hub 81 of plate 79 is a member 82, see also Figure 6, provided with a stud 83 having a roller 84 resting in the lower portion of a slot in the rear end of plate 79, the parts being normally held in the Figure 6 position by a spring 85 between the plate 79 and member 82.

Stud 83 projects to the outside of member 82 and has a large spacer washer and another roller 84 on the outer projection. Roller 84 is, in the normal position of member 82, positioned below an inturned cam surface 87 of a punch cocking lever 86 pivoted on a screw 88 in the side frame 100. Lever 86 is guided at its upper end in a slot of a bracket 89 secured to the side plate 100 and is urged counterclockwise in Figure 6 by a spring 91. Lever 86 has near its center, an aperture having a forward edge 94 which is held by spring 91 in engagement with a bent-off ear 90 of a restoring plate 92, see Figure 8. To the rear of aperture 94, lever 86 carries a stud 96 engaged by an inclined face of a detent 97 pivoted on a stud 99 in sidewall 100 and urged counterclockwise in Figure 6 by a spring 101. Restoring plate 92, Figures 3 and 13 is slidable on four fixed rods 139 secured in cross braces 138 and 143 between sidewalls 100 and is urged forwardly by strong springs 102 about the posts 139 and between the rear brace 143 and plate 92.

During an operation of the adding machine, link 69 will be pulled upwardly to rock shaft 77 clockwise in Figure 6. Plate 79 secured to shaft 77 will rock clockwise and through the engagement of stud 83 with the bottom of the slot in plate 79, member 82 will rock therewith. Roller 84 on stud 83 will engage the cam surface 87 to rock cocking lever 86 counterclockwise in Figure 6 until stud 96 on the lever is positioned above notch 98 in detent 97 which detent will then be pulled by spring 101 to latch cocking lever 86 in the set position. During this motion of lever 86, restoring plate 92 will be moved to the rear to compress springs 102 as will be evident from Figure 9.

Continued motion of shaft 77 will move roller 84 above cam surface 87 into a position slightly clockwise from that shown in Figure 12. In this position of shaft 77, a stud 104 on plate 79 is to the left of the ends of a pair of bypass pawls 106 and 107 to be later described.

*Conditioning the punches*

As best seen in Figure 1, there is secured to the lower end of each type bar 33, through link 111, a rack bar 113. As the type bars 33 rise during a machine cycle, racks 113, secured thereto, are lifted a differential distance as determined by the engagement of tail pins 37 with stop pins 31. Racks 113 are guided in slots in the upper one of a pair of fixed guides 112, see also Figures 8 and 13, and during their movement will rotate gears 118 which are secured in any suitable manner to a group of notched discs 120. Each gear 118 with its notched disc 120 is loosely mounted for individual rotation on a shaft 122, Figure 8, which is supported between side frames 100 by screws 103, Figure 3. The discs 120 pass through slots in lower guide 112 which spaces the discs 120 to retain the gears 118 in engagement with the associated rack 113. During the first half cycle of the adding machine, type bars 33 and racks 113 will have been raised to differential positions, thus positioning notched discs 120 with a selected one of the plurality of notched portions in position to control the tape punches.

*The notched disc aligning mechanism*

As notched discs 120 are to control tape punching, they must be retained in a set position during such punching. Referring to Figure 11, plate 79 is shown after it has moved a few degrees of its return, counterclockwise, stroke from the mid cycle position. At this point it will be seen that stud 104 has contacted a rear face of bypass pawl 107, which extends somewhat more rearwardly than pawl 106. Pawl 107 is pivoted on a stud 110 of a lever 117 and has a turned-off tab 115 underlying lever 117. Lever 117 is loosely mounted on a shaft 119 extending through side frames 100 and is retained on shaft 119 by a collar 116. A spring 105 connected between lever 117 and pawl 107 normally holds pawl 107 with tab 115 in contact with lever 117 but will permit movement of pawl 107 to the Figure 10 position by stud 104 during the clockwise stroke of plate 79. Stud 104 has, at the Figure 11 position, rocked lever 117, through pawl 107 and tab 115, in a clockwise direction from the Figure 1 position. A roller 114, fixed at the lower end of lever 117, engages a cam surface 121 of an aligner controlling lever 127 and rocks said lever clockwise in Figure 11 about its pivot 124 in opposition to a spring 123 at the rear of lever 127. Lever 127 normally overlies an aligning bar 125 vertically slidable in side plates 100 and resiliently connected to lever 127 by a spring 126 between aligner bar 125 and each lever 127. The rear portion of lever 127 is elevated when lever 117 rocks to move roller 114 along the cam surface 121 and aligning bar 125 will yieldingly follow the lever 127 to move into aligning grooves 128 in notched discs 120, there being a groove 128 to receive aligner 125 at each digital position of gear 118 and disc 120.

At this point in the cycle an aligner for the type bars 33 will also be effective to retain the type bars 33 in the printing position, as described in the above mentioned Patent 1,965,611. The value set up in type bars 33, either a total or an item, will be printed on the adding machine tape 51 while notched discs 120 are positioned for punching so that the amount printed by the type bars 33 will be punched, in the form of a code, in a paper tape, by the mechanism next described.

*The punching mechanism*

Referring now to Figure 12 it will be seen that plate 79 has returned a few additional degrees counterclockwise from the Figure 11 position and stud 104 thereon has contacted and rocked a second bypass pawl 106 (pawl 107 remaining effectively held by stud 104). Pawl 106 is pivoted in an upwardly extending arm of a latch 131 pivoted on shaft 119 between lever 117 and side plate 100 and is urged clockwise about its pivot by a spring 129 to the Figure 9 position where it is in engagement with a tab 130 bent off the arm of latch 131. During clockwise movement of plate 79, stud 104 will contact pawl 106 to rock it on its pivot and stretch spring 129 as shown in Figure 10. During the return of plate 79, stud 104 thereon will, as shown in Figure 12, rock pawl 106 and latch 131 clockwise to release a stud 134 from a notch in the rear arm of latch 131. Stud 134 is secured in a punch die block 136 formed as shown in Figures 8 and 13 of two plates with a shallow horizontal groove in one or both of them to carry a paper tape horizontally across the machine. Punch die block 136 is slidable on the rods 139 in front of the restoring plate 92 and is urged rearwardly by springs 137 about rods 139 between the block 136 and the forward braces 138. Release of latch 131 from stud 134 allows punch die block 136 to be driven rearwardly (to the left, Figure 8) into the punching position of Figure 13 by springs 137 to a limit position against a group of stops 140 mounted in the rear brace 143, see Figure 13.

As best seen in Figures 3, 8 and 13, a group of punch rods 141 are slidably supported in aligned holes in rear brace 143 and in the rear plate of punch die block 136 and are yieldably held by very light springs 142, in their forward positions shown in Figure 8. The forward portions of rods 141 are normally positioned to the rear of the tape 145 which passes through the groove in punch die block 136.

In Figure 13, the notched disc 120 is assumed to have been rotated, as previously described, to the position corresponding with the digit 6 which will be printed on the paper 51 by type 35, and said notched disc is being held in the position shown by aligner 125. Restoring plate 92 has at this time been moved from the Figure 8 to the Figure 13 position and is held there by latch 97. When latch 131 is rocked from the Figure 9 to the Figure 12 position to free the punch block 136, the block 136 will be impelled rearwardly by its springs 137, until it is arrested by stops 140. The punch block 136 during this rearward motion will carry along with it tape 145 in the slot of block 136. Tape 145 during this movement encounters the forward ends of rods 141 and carries all of the rods 141 slightly rearwardly, compressing the light springs 142. Should the rear end 147 of any of the rods 141 strike a high portion of the periphery of a notched disc 120 and be blocked from a full sliding movement with block 136, such rod or rods 141 will be forced through the tape 145 to punch a code therein as shown in Figure 4. The section of the punched tape resulting from such operation is shown in Figure 5.

*The code*

The code indicated as punched in tape 145 by rods 141 is the well known binary code although any desired code may be used by proper shaping of discs 120 and an examination of Figure 5 will show that the amount printed on the record tape 51 by the type 35 is reproduced in coded form in tape 145 by rods 141. As shown, the uppermost row of holes 150 in tape 145 represent, in each vertical denominational order, the digit 8, while the row of holes 151 immediately below represents, for each such order, the digit 4. The holes 152 in the next row are of smaller diameter and always punched in every denominational order during a machine cycle. These holes have no numerical significance and may be used for feeding the tape in a tape reading machine at a later time. The holes 153 immediately below the small holes 152 represent the digit 2 while the next to the bottom row of holes 154 represent the digit 1.

The lowest row of holes 155 do not have a digital value but are punched to indicate to a reading device that the punched holes in the associated column have a numerical significance. Where tape 145 is to also have punched holes representing non-numerical amounts, the punches 141 in the lowest row 155 will be omitted in the columns for such representations. The punches 156 which punch such lower row of holes 155 do not contact the discs 120 but are held in punching position by a plate 157 secured across the back of the lowest row of holes in brace 143 as shown in Figure 8.

In Figure 8, the full outline characteristic of the discs 120 is shown and each section is marked with the digit value which will be punched when that section is aligned with punches 141. It will be seen that in normal rest position of the machine, each of the discs 120 stands with the code 9 at the punching station. In the "Sundstrand" type of of adding machine used in this disclosure of my preferred embodiment, the type bars stand one step below the "0" printing position in the normal or rest position and will always rise to at least the "0" position at every machine cycle. This movement to "0" will rotate disc 120 one section clockwise in Figure 8 and position the "0" section at the punching station. For the "0" printing position of disc 120, only the small centrally located punch rod 141 in each denominational order will have its movement by tape 145 obstructed, thereby punching the tape-feed holes 152 and, for the numerical denominations only, indicator holes 155 will be punched by fixed punch rods 156 at every cycle.

*Restoration of mechanism to normal*

Referring now to Figure 14 showing plate 79 at a point slightly later than that of Figure 12, it will be seen that stud 104 continues to rock latch 131 after stud 134 is released and at the illustrated stage of the cycle, stud 104 has rocked latch 131 to its clockwise limit and is releasing the latch. This further movement of latch 131 after release of stud 134 serves to rock a lever 160 counterclockwise about its pivot screw 162 by the engagement of a stud 163, on latch 131, with a forwardly extending tab 164 of lever 160. At its rear portion a tab 165 of lever 160 overlies a stud 166 on latch pawl 97. At the cycle point shown in Figure 14, it will be noted that rocking of lever 160 by latch 131 has lowered latch 97 to free stud 96 on lever 86 whereupon springs 102, Figure 13, will force restoring plate 92, lever 86, punch die block 136 and paper tape 145 back to their original positions as in Figures 6 and 8. Springs 102 are substantially stronger than springs 137 for the punch die block 136 and during this restoring motion will act to recompress springs 137 for a subsequent punching operation.

As stud 104 moves away from pawl 106 at this time, latch 131 is released to the action of its spring 132 to rock counterclockwise and latch stud 134 and punch block 136 in their restored positions. Return of latch 131 releases lever 160 and latch 97 for relatching of stud 96 in the next punching cycle. At about the same time that stud 104 releases pawl 106, the stud will also release pawl 107, Figure 11. Such release of pawl 107 will release lever 117, lever 127, and aligner bar 125 for movement by springs 123 back to their normal positions clear of notched discs 120 as in Figure 6.

During the remaining counterclockwise restoration of plate 79, roller 84 on arm 82 will be moved into engagement with the rear face of cam 87 on lever 86. Restoring plate 92 should at this time have restored lever 86 to its normal position as shown in Figure 6 wherein roller 84 will be to the rear of cam 87 but should there be a slight delay in restoration of lever 86, roller 84 will strike the top end of cam 87 and hold arm 82 stationary. Arm 79 will continue its return unimpeded as spring 85 will stretch to enable stud 83 to move in the slot in plate 79 as is illustrated in Figure 16. When lever 86 is restored by plate 92, spring 85 will return arm 82 to its normal position with respect to plate 79.

Near the end of return of arm 82, roller 84 will act on cam 87 to move lever 86 further clockwise from its normal, Figure 6, position until roller 84 moves below cam 87 and spring 91 returns lever 86 to the rest position against ear 90 of plate 92. Plate 92 does not follow lever 86 in this final movement for it is pressed by its springs 102 against the punch die block 136 which is locked against forward movement by the engagement of stud 134 with latch 131. As soon as restoring plate 92 and punch die block 136 move to their restored positions, punches 141 are free of restraint by the punch tape 145 and are returned by their springs 142 to the positions of Figure 8 wherein they are clear of discs 120. Discs 120 and rack bars 113 will be returned to their normal positions by the restoring bar 49 during the remainder of the machine cycle. Thus at the end of return of plate 79 and arm 82, all parts of the punching section have operated and been returned to their rest positions.

*Tape feed*

After a tape 145 has been punched during a cycle, it is necessary to move the punched section from the punching area and put an unused portion of the tape in position to receive the next item. A tape supply reel and a tape wind up reel may be provided but have not been disclosed herein as such items are known and form no part of my invention.

As best seen in Figures 2 and 3, the tape feed unit is mounted on a bracket 168 secured to the right side frame 100 by studs 169 and spacers 170. Bracket 168 has an upper flange 171 and a lower flange 172 bent off horizontally at right angles to side frame 100 and has a vertical shaft 173, rotatably held in the flanges 171 and 172 by collars 174. Shaft 173 has mounted thereon a tape feeding drum 175 which has a drive ratchet wheel 176 secured to its upper surface. A feed arm 177 is free on shaft 173 above ratchet wheel 176 and has pivotally mounted on its underside a feed pawl 178 urged into the teeth of drive ratchet 176 by a spring 179. Feed arm 177 is connected by a drive link 181 to an arm 183 depending from the right end of shaft 77. Drive link 181 is pivotally connected to studs 180 and 182 rotatable in feed arm 177 and drive arm 183 respectively to operate feed arm 177 from arm 183 without binding. A pair of feed rolls 184 are mounted between a pair of plates 185 and are resiliently held against feeding drum 175, by a pair of springs 186, connected between the upper and lower portions of a rod 187, secured in plates 185 and a pair of studs 188 one on each flange 171 and 172. The upper and lower portions of rod 187 are held in slots 189 of flanges 171 and 172 to hold the feed rolls 184 against endwise movement.

During the first half of the machine cycle, lever arm 183 will operate feed arm 177 about shaft 173 in a clockwise direction, Figure 3, with pawl 178 ratcheting idly over the teeth of ratchet 176. After the tape 145 has been punched and after a time delay determined by the amount of lost motion in the connection between arms 177 and 183, drive arm 183 will start to return feed arm 177 counterclockwise whereupon pawl 178 will engage in the teeth of ratchet 176 and drive said ratchet counterclockwise. The tape 145 is passed between drum 175 and feed rolls 184 and will thereby be moved the necessary distance to provide a fresh surface of tape to receive punchings from rods 141 during the subsequent cycle.

*Summary*

The disclosed embodiment of the invention comprises a printing adding machine by which items and totals may be printed upon a paper tape 51 and a punching mechanism controlled by the adding machine to punch in a second paper tape 145, holes representing the item and totals printed by the adding machine. Movement of the adding machine type bars 33 to printing positions will simultaneously rotate a set of punch control discs 120 to positions representative of the amount to be printed.

During the movement of type bars 33 and discs 120 to their set positions, a restoring plate is driven to a cocked position against the urge of its springs and is latched in this position. As soon as the adding machine starts the return half of its cycle of operations, an aligner bar 125 is moved into notches in discs 120 to align the discs for punching and immediately thereafter a punch die block 136 is released to be driven by its springs 137 toward the notched discs 120. Block 136 carries a paper tape 145 which is moved into engagement with the ends of a plurality of punches 141 to move them into engagement with the notched discs 120. Those punches 141 which strike high spots on discs 120 will be stopped and will perforate the tape 145 in its continued movement while those punches 141 which are aligned with low spots on discs 120 will not perforate tape 145.

The tape may receive the perforations in any desired coded representation and may have other holes punched therein by fixed punches for indicating the type of data punched, the particular punchings being determined by the information to be recorded. As soon as the tape 145 has been punched, the restoring plate 92 which was latched during the first half cycle, is released to drive the punch die block 136 and paper tape 145 back to their original positions. The aligner 125 for the discs 120 will have been released at about this time and further cycling of the adding machine will return the type bars 33 and discs 120 to their home positions and will also move the punched section of tape 145 out of the punching zone so that a new section of tape will be in position for punching during a succeeding machine cycle.

The above description of a preferred embodiment of my invention is not to be taken as limiting the scope of the invention as many variations in structure and cooperation of parts are possible wtihout departure from the scope of the invention as set forth in the following claims.

What is claimed is:

1. In a punching mechanism having a general operating means and denominational members settable to represent a multi-denominational value, the combination of a plurality of punches for each denominational member, a punch die having perforations through which the ends of said punches may pass, said punch die also supporting a perforatable tape between the ends of said punches and the perforations in said punch die, resilient means to relatively move said punch die and said denominational members toward each other whereby selected punches will engage said denominational members and be forced through said tape, a latch to hold said resilient means ineffective, a spring, means driven by said spring to bias said resilient means to ineffective position, and connecting members driven from said general operating means to withdraw said spring driven means to then release said latch to effect a punching operation of said punch die by said resilient means, and to thereafter free said spring driven means to restore said resilient means to control by said latch.

2. The combination as set out in claim 1 including a second latch to hold said spring driven means in the withdrawn position and a lever linking said second latch to said first mentioned latch to release said second latch by continued movement of said first mentioned latch after said punch die is released whereby said spring driven means is released to restore said punch die immediately after a punching movement thereof.

3. The improvement as set out in claim 2 including an aligning bar engageable with all said denominational members to prevent movement thereof while said punches are engaged with said denominational members, and members driven by said general operating mechanism to urge said aligning bar into engagement with said denominational members prior to engagement of said punches therewith.

4. The improvement as set out in claim 1 including a pair of rolls engaging said perforatable tape at a point near said punch die, a drive arm cyclically moved by said general operating means, and a unidirectional drive from said arm to one of said rolls to withdraw perforated tape from said punch die after said punch die is restored to a latched position.

5. A tape perforating mechanism comprising a plurality of settable racks a cyclically operated driving mechanism, a disc associated with each rack, operating means attached to each of said discs and cooperating with each of said racks to rotate said discs to first a set and then a restored position, each disc having punch controlling elevations thereon for each position to which said disc may be set by said associated rack, a punch die block, a plurality of punches between said die block and each said disc, a perforatable tape between said punches and said die block, a first spring means to drive said die block, said tape and said punches toward said discs, each said elevation which is engaged by a punch preventing full movement of said engaged punch whereby said punch is forced through said tape, a second spring means, a die block restoring plate driven by said second spring means, a first latch holding said die block in a normal position and controlled by said cyclically operating mechanism to release said punch die block for a punching operation, a second latch to hold said restoring plate in a cocked position and means connecting said two latches to release said restoring plate after release of said die block.

6. The improvement as set out in claim 5 including an aligner bar to hold said discs in a set position during punching of said tape, a linkage including a resilient element to engage said aligner bar with said discs, and means to operate said linkage during a portion of the return movement of said cyclically operating mechanism.

7. A punching and printing mechanism as set out in claim 5 including a pair of feed rolls resiliently urged together to grasp said tape at the discharge side of said die block, a drive arm cyclically driven by said operating mechanism and a pawl and ratchet wheel connected between said drive arm and one of said feed rolls to rotate said feed rolls and withdraw a perforated section of tape from alignment with said punches.

References Cited in the file of this patent

UNITED STATES PATENTS

| | | |
|---|---|---|
| Re. 20,746 | Kurowski | May 31, 1938 |
| 978,480 | Pearson | Dec. 13, 1910 |
| 1,347,445 | Crocco | July 20, 1920 |
| 2,228,330 | Torkelson | Jan. 14, 1941 |
| 2,229,905 | Sundstrand | Jan. 28, 1941 |
| 2,330,997 | Rix | Oct. 5, 1943 |
| 2,490,373 | Page | Dec. 6, 1949 |
| 2,589,271 | Miller | Mar. 18, 1952 |
| 2,602,507 | Adams | July 8, 1952 |
| 2,714,928 | Rotkin | Aug. 9, 1955 |